US011570680B2

United States Patent
Nittala et al.

(10) Patent No.: US 11,570,680 B2
(45) Date of Patent: *Jan. 31, 2023

(54) MULTI-STAGE HANDOVER

(71) Applicant: Parallel Wireless, Inc., Nashua, NH (US)

(72) Inventors: Lakshmikishore Nittala, Nashua, NH (US); Hritesh Yadav, Nashua, NH (US)

(73) Assignee: Parallel Wireless, Inc., Nashua, NH (US)

( * ) Notice: Subject to any disclaimer, the term of this patent is extended or adjusted under 35 U.S.C. 154(b) by 184 days.

This patent is subject to a terminal disclaimer.

(21) Appl. No.: 16/861,194

(22) Filed: Apr. 28, 2020

(65) Prior Publication Data

US 2020/0260352 A1 Aug. 13, 2020

Related U.S. Application Data

(63) Continuation of application No. 15/698,638, filed on Sep. 7, 2017, now Pat. No. 10,638,394.

(60) Provisional application No. 62/384,681, filed on Sep. 7, 2016.

(51) Int. Cl.
*H04W 36/30* (2009.01)
*H04W 36/00* (2009.01)
*H04W 24/10* (2009.01)
*H04W 36/04* (2009.01)
*H04W 36/32* (2009.01)
*H04W 36/08* (2009.01)

(52) U.S. Cl.
CPC ........... *H04W 36/30* (2013.01); *H04W 24/10* (2013.01); *H04W 36/0061* (2013.01); *H04W 36/0085* (2018.08); *H04W 36/00837* (2018.08); *H04W 36/04* (2013.01); *H04W 36/0058* (2018.08); *H04W 36/08* (2013.01); *H04W 36/32* (2013.01)

(58) Field of Classification Search
None
See application file for complete search history.

(56) References Cited

U.S. PATENT DOCUMENTS 9,521,605 B2 * 12/2016 Oh .................. H04B 7/0617
2014/0050182 A1 * 2/2014 Iwai .................. H04W 52/362
370/329

(Continued)

*Primary Examiner* — Edan Orgad
*Assistant Examiner* — Emmanuel K Maglo
(74) *Attorney, Agent, or Firm* — Michael Y. Saji; David W. Rouille

(57) ABSTRACT

Systems and methods for enabling a handover decision are disclosed. In one embodiment, a method is disclosed comprising configuring a UE with a first offset and a second offset, the second offset greater than the first offset; instructing the UE to enter a handover decision state upon receiving a first measurement report from a UE indicating that a neighbor cell has a better received signal strength than the serving cell by the first offset; instructing the UE to send periodic measurement reports with signal strength of the serving cell and the neighbor cell; delaying handover decision by remaining in the handover decision state until receiving a second measurement report from the UE; and instructing the UE to hand over to the neighbor cell when the neighbor cell has a better received signal strength than the serving cell than the second offset.

8 Claims, 5 Drawing Sheets

(56) References Cited

U.S. PATENT DOCUMENTS

| | | | | |
|---|---|---|---|---|
| 2014/0099962 A1* | 4/2014 | Capdevielle | | H04W 64/006 |
| | | | | 455/441 |
| 2014/0321430 A1* | 10/2014 | Bakker | | H04W 76/19 |
| | | | | 370/331 |
| 2015/0118968 A1* | 4/2015 | Nory | | H04W 36/00835 |
| | | | | 455/67.11 |
| 2015/0195758 A1* | 7/2015 | Kim | | H04W 36/0088 |
| | | | | 370/252 |
| 2015/0358477 A1* | 12/2015 | Jeong | | H04W 40/24 |
| | | | | 370/259 |
| 2015/0358864 A1* | 12/2015 | Park | | H04W 36/0058 |
| | | | | 370/331 |
| 2016/0014666 A1* | 1/2016 | Muller | | H04W 36/165 |
| | | | | 455/436 |
| 2016/0050598 A1* | 2/2016 | Dalsgaard | | H04W 76/28 |
| | | | | 370/331 |
| 2016/0205601 A1* | 7/2016 | Yiu | | H04L 5/0051 |
| | | | | 455/444 |
| 2016/0302119 A1* | 10/2016 | Chen | | H04W 36/03 |
| 2017/0188273 A1* | 6/2017 | Yiu | | H04W 24/10 |
| 2020/0127925 A1* | 4/2020 | Kim | | H04W 24/10 |

\* cited by examiner

MULTI-STAGE HANDOVER

CROSS-REFERENCE TO RELATED APPLICATIONS

This application is a continuation of, and claims the benefit of an earlier filing date under 35 U.S.C. § 120 based on, U.S. patent application Ser. No. 15/698,638, filed Sep. 7, 2017, and entitled "MultiStage Handover," which itself is a non-provisional conversion of, and claims priority under 35 U.S.C. § 119(e) to, U.S. Provisional Application No. 62/384,681, titled "Multi-Stage Handover With ICIC" and filed Sep. 7, 2016, each hereby incorporated by reference in its entirety for all purposes. In addition, 3GPP TS 36.331 v.9.3.0, titled "3rd Generation Partnership Project; Technical Specification Group Radio Access Network; Evolved Universal Terrestrial Radio Access (E-UTRA); Radio Resource Control (RRC); Protocol specification (Release 9)" is hereby incorporated by reference in its entirety for all purposes. In addition, U.S. Pat. App. Pub. No. US20160142944A1, U.S. Pat. App. Pub. No. US20160360458A1, and U.S. patent application Ser. Nos. 14/183,176; 14/777,246; 14/453,365; 14/454,670; 14/542,544; 14/828,432; 14/853,647; and 14/868,074 are each hereby incorporated by reference herein in their entirety for all purposes.

BACKGROUND

The 3rd Generation Partnership Project (3GPP) Long Term Evolution (LTE) Release 8 (Rel-8) standard for wireless communication systems has recently been finalized, supporting bandwidths up to 20 megahertz (MHz). LTE and High-Speed Packet Access (HSPA) are sometimes called "third generation" (3G) communication systems and are currently being standardized by the 3GPP. The LTE specifications can be seen as an evolution of the current wideband code division multiple access (WCDMA) specifications.

According to the 3GPP LTE protocol, handovers from one cell to another cell are performed in various circumstances. It is known in the art to hand over a user equipment (UE) from the current serving cell to another neighboring cell when the signal strength from the serving cell drops and the signal strength from the neighboring cell rises above the signal strength from the serving cell plus an offset value.

SUMMARY

In one aspect or embodiment, a method is disclosed for enabling a handover decision, comprising: configuring a UE with a first offset and a second offset, the second offset greater than the first offset; instructing the UE to enter a handover decision state upon receiving a first measurement report from a UE indicating that a neighbor cell has a better received signal strength than the serving cell by the first offset; instructing the UE to send periodic measurement reports with signal strength of the serving cell and the neighbor cell; delaying handover decision by remaining in the handover decision state until receiving a second measurement report from the UE; and instructing the UE to exit the handover decision state when the second measurement report indicates that the neighbor cell no longer has a better received signal strength than the serving cell by the first offset.

The method may further comprise configuring the UE with a first hysteresis and a second hysteresis. The method may further comprise configuring the UE with a per-cell first offset and a per-cell second offset. The method may further comprise configuring the UE to accelerate handover from a macro cell to a small cell and to reduce handover from a small cell to a macro cell. The method may further comprise instructing a second UE to exit the handover decision state when the second measurement report indicates that the neighbor cell no longer has a better received signal strength than the serving cell by the first offset.

In another aspect or embodiment, a method is disclosed for enabling a handover decision, comprising: configuring a UE with a first offset and a second offset, the second offset greater than the first offset; instructing the UE to enter a handover decision state upon receiving a first measurement report from a UE indicating that a neighbor cell has a better received signal strength than the serving cell by the first offset; instructing the UE to send periodic measurement reports with signal strength of the serving cell and the neighbor cell; delaying handover decision by remaining in the handover decision state until receiving a second measurement report from the UE; and instructing the UE to hand over to the neighbor cell when the neighbor cell has a better received signal strength than the serving cell than the second offset.

The method may further comprise configuring the UE with a first hysteresis and a second hysteresis. The method may further comprise configuring the UE with a per-cell first offset and a per-cell second offset. The method may further comprise configuring the UE to accelerate handover from a macro cell to a small cell and to reduce handover from a small cell to a macro cell. The method may further comprise instructing a second UE to hand over to the neighbor cell when the neighbor cell has a better received signal strength than the serving cell than the second offset.

In another aspect or embodiment, a base station for enabling a handover decision is disclosed, comprising: a processor for performing instructions; a first radio interface in communication with a user equipment (UE) and coupled to the processor; a backhaul connection in communication with an operator core network and coupled to the processor; and a memory containing the instructions, which, when executed by the processor, cause the base station to: configure a UE with a first offset and a second offset, the second offset greater than the first offset; instruct the UE to enter a handover decision state upon receiving a first measurement report from a UE indicating that a neighbor cell has a better received signal strength than the serving cell by the first offset; instruct the UE to send periodic measurement reports with signal strength of the serving cell and the neighbor cell; delay handover decision by remaining in the handover decision state until receiving a second measurement report from the UE; instruct the UE to hand over to the neighbor cell when the neighbor cell has a better received signal strength than the serving cell than the second offset; and instruct the UE to exit the handover decision state when the second measurement report indicates that the neighbor cell no longer has a better received signal strength than the serving cell by the first offset.

The instructions may further comprise configuring the UE with a first hysteresis and a second hysteresis. The instructions may further comprise configuring the UE with a per-cell first offset and a per-cell second offset. The instructions may further comprise configuring the UE to accelerate handover from a macro cell to a small cell and to reduce handover from a small cell to a macro cell. The instructions may further comprise instructing a second UE to hand over to the neighbor cell when the neighbor cell has a better received signal strength than the serving cell than the second offset, or to hand over to the neighbor cell when the neighbor cell has a better received signal strength than the serving cell than the second offset.

In another aspect or embodiment, a non-transitory computer-readable medium having stored therein a set of instructions which, when executed by a computer-based system, cause the computer-based system to: configure a UE with a first offset and a second offset, the second offset greater than the first offset; instruct the UE to enter a handover decision state upon receiving a first measurement report from a UE indicating that a neighbor cell has a better received signal strength than the serving cell by the first offset; instruct the UE to send periodic measurement reports with signal strength of the serving cell and the neighbor cell; delay handover decision by remaining in the handover decision state until receiving a second measurement report from the UE; instruct the UE to hand over to the neighbor cell when the neighbor cell has a better received signal strength than the serving cell than the second offset; and instruct the UE to exit the handover decision state when the second measurement report indicates that the neighbor cell no longer has a better received signal strength than the serving cell by the first offset.

DETAILED DESCRIPTION

Figure 1:
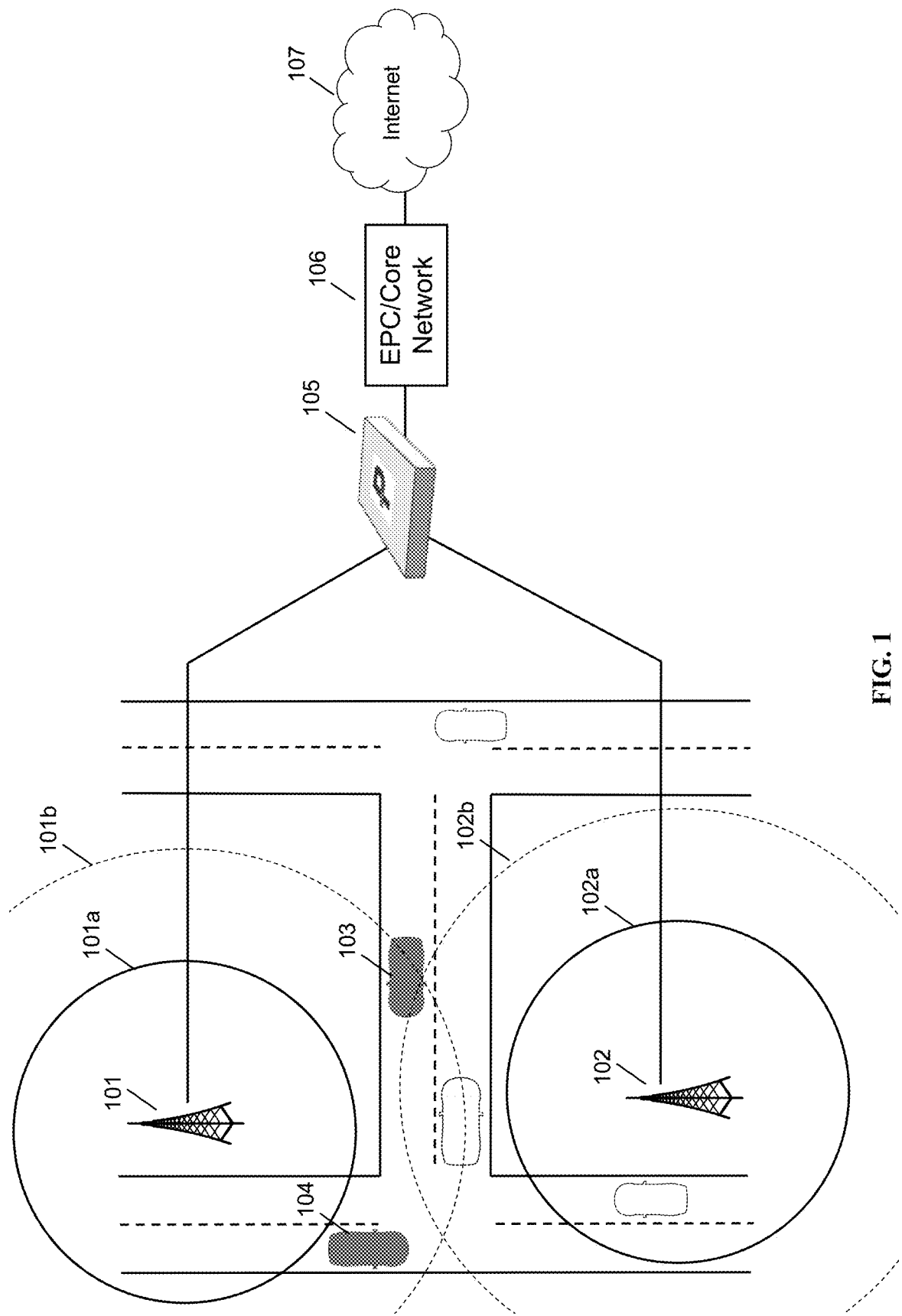
FIG. 1 is a schematic diagram of a network, in accordance with some embodiments.

FIG. 1 is a schematic diagram of a network, in accordance with some embodiments. A base station 101, acting as a serving base station, and a second base station 102, acting as a neighboring base station, provide LTE service to users in the surrounding area, such as in vehicles 103 and 104. A UE in a vehicle 103, henceforth UE 103, is located at the edge of both cell 101 and 102. A UE in a vehicle 104, henceforth UE 104, is located in a coverage area of cell 101 and not in a coverage area of cell 102, but is moving towards cell 102. Coverage area 101a of cell 101 is a notional cell center area. Coverage area 101b of cell 101 is a notional cell edge area. Coverage area 102a of cell 102 is a notional cell center area. Coverage area 102b of cell 102 is a notional cell edge area. In some embodiments, cell 101 and cell 102 are managed by a heterogeneous network gateway such as a Parallel Wireless™ HetNet Gateway (HNG)™ 104, and are coupled to the LTE evolved packet core (EPC) 105 via the HNG 104. In other embodiments, cell 101 and cell 102 are coupled to EPC core network 105 without HNG 104. EPC 105 provides a gateway to the Internet 106.

It is known in the art that the UE may in some cases send measurements to the serving cell (i.e., the cell the UE is currently connected to); this transmission is called a measurement report, and measurement reports by the UE are configured by the eNodeB, so the eNodeB specifies what to measure, when to report it, and how to report. It is also known that the UE evaluates an evaluation criterion ("event" or "trigger" as used herein) based on signal measurements of its serving cell and any neighboring cells, and may be instructed to take certain action depending on the outcome of evaluating this criterion, event, or trigger. Measurement reports and events work together to enable a UE to proactively inform an eNodeB that its radio conditions are changing, for example, when it is exiting a coverage area of a serving cell and entering into a coverage area of a neighboring cell.

In a macro overlay/underlay scenario, a macro base station provides coverage over a large area, while additional base stations, variously termed overlay or underlay base stations or small cell base stations, provide enhanced coverage within smaller areas that are located within the coverage area of the macro base station. It is undesirable for a UE to hand over from a small cell base station to the macro base station in situations where the small cell is typically intended to provide capacity offload for the macro. However, the standard LTE protocol is set up to make this a likely possibility.

The 3GPP radio resource control (RRC) specification include various event triggers for issuing reports from the UE to the eNodeB, including:

Event A1: Serving cell becomes better than a threshold;

Event A2: Serving cell becomes below a threshold;

Event A3: Neighboring cell becomes better than serving cell by an offset (the offset acting to reduce the frequency of handovers by requiring the neighboring cell to have significantly higher signal quality than the serving cell);

Event A4: Neighboring cell becomes better than a threshold;

Event A5: Serving cell below A5 threshold 1 and neighbor cell better than A5 threshold 2;

Event B1: Inter-radio access technology (inter-RAT) neighbor becomes better than a threshold;

Event B2: Serving cell below B2 threshold 1 and inter-RAT neighbor better than B2 threshold 2.

There are also entering and leaving conditions and hysteresis parameters for each event. In the present disclosure, hysteresis parameters are contemplated according to the same principles understood by 3GPP TS 25.331 and TS 36.331, each incorporated by reference in its entirety for all purposes, but are not described in detail for the present disclosure. One of skill in the art would understand that the present disclosure could be enhanced by the use of hysteresis parameter for both entry and exit of a particular event state. In some embodiments, frequency specific offsets, cell specific offsets, and per-cell hysteresis parameters are also contemplated.

As described by the prior art, there are only a few ways for optimizing handovers in LTE: via modification of the offset associated with event A3; via modification of the hysteresis parameter for event A3; changing a parameter called timetotriggereventa3, or "time to trigger event A3," used specifically to prevent "ping pong" handovers from a first cell to a second cell and immediately back to the first cell; or by modifying the parameter filtercoefficient for event A3. However, the A3 event by itself is largely inadequate for optimizing handovers. Instead, by using different measurement IDs, handover decision is delayed, enabling continuing serving the UE in the current cell, unless the UE definitely needs a handover. The A3 event described above is broken into two different events, identified herein as A3' and A3". Two new events/triggers are proposed, as follows:

Event A3': Neighbor cell is better than serving cell by first offset;

Event A3": Neighbor cell is better than serving cell by second offset greater than first offset.

The following scenarios describe this method.

Scenario 1: 1. UE reports event A2 indicating serving cell is below threshold; 2. UE is then configured with events A3', A3" and A1. Operation continues per scenarios 1a or 1b below.

Scenario 1a may be as follows. a. UE reports events A3', suggesting that the neighbor cell is better than serving cell by offset A3Offset' dBm. b. eNB shall put this UE as a cell edge UE, and will configure fixed (configurable, low in value) RBs with QPSK modulation. c. Handover is not triggered, yet. d. In this case two things can happen: i. UE can report events A3", indicating the serving cell has further deteriorated. Handover is triggered here; or ii. UE can report event A1, indicating the serving cell is better now, thus removing the need for handover.

Scenario 1b: a. UE reports event A3", indicating the serving cell has gone too bad. Handover is triggered.

Scenario 2: 1. UE reports A3'. 2. In this case UE is configured with steps b, c and d (as in scenario 1a).

Scenario 3 may be as follows: 1. UE reports event A3", even before events A2 and A3'. 2. eNB shall check for the reported RSRP at serving cell. If the reported value is greater than a configured threshold, then handover is not triggered. Checks are continued for all the periodic reports provided by the UE for serving cell and the neighbor cell. To keep the BLER under lower value (due to interference from the neighbor) a lower order modulation and coding scheme (MCS) is chosen. If the reported value is lower than configured value, then handover is triggered.

Advantages of this solution may include, in some embodiments: 1. By adding one more step (A3"), the UE is served for a bit more longer period in the current serving cell. As well, 2. This helps in a. Avoiding ping pongs; b. Situations where the serving cell becomes better; c. Situations where the target cell goes bad; d. Better utilization of ICIC for handover optimizations, since cell edge users are provided with fixed resource blocks from a configured location with QPSK modulation; e. Cell edge key performance indicators (KPIs) will improve (no. of UEs served in cell edge conditions); f. Offloading to a macro will be reduced. Drawbacks of this solution are manageable and may include, in some embodiments: Increased L3 messaging (this is required for configuration of certain events at certain intervals after a condition is met).

The current solution is not good because we don't take into consideration the serving cell's ability to retain the call. Only whether the target cell is better is currently used. The best example of how this approach is different from the known prior art is small cell overlay/underlay. The small cell will ideally retain the call, because it is attempting to offload the macro. This is not the behavior currently.

A first step of a solution is to assess the serving cell. If the UE reports an event, first step is to reduce the modulation, enabling a UE to physically move back into better coverage. However, if an A2 event is registered, the serving cell is continuing to deteriorate. The cell may reduce the modulation, e.g., from 64QAM to 16QAM. When an A3' event is registered, a further reduction to QPSK may be performed.

If the source cell is not sure whether target cell is able to take handover, if UE then reports A1, we can cancel all requested measurement reports as serving cell is able to retain the call. If UE reports A3", then we know the target cell is ideal for handover, so then we perform handover.

On an A3" event we can keep performance at QPSK, or, go up to 16QAM. We do not need to look for throughput. We are making an assumption that the UE is at the cell edge, and we want to retain call for as long as possible.

In some embodiments, a cell individual offset may be used. Actually this is extremely flexible and permits handover to a poorer-quality cell. This is how we would cause the macro to hand off to a small cell. In summary, the goal could be: Accelerate handover from the macro; and delay handover to the macro; thus enabling traffic offload. Different cells may have different offsets for both A3' and A3". Different cells may share the same offsets. In some embodiments it is contemplated to set individual offsets, either for A3' and A3", or both, in a macro overlay/underlay scenario to cause accelerated handover from the macro to the small cell (i.e., small offsets), and slower handover from the small cell to the macro (i.e., large offsets).

There will be noticeable improvements in handover performance. To provide a rural/gap filling solution, we have to make sure that the calls are retained as much as possible, to offload the macro. The proposed method would reduce unnecessary handoffs, as handover is not performed because the target cell is better by a small amount. Handover proceeds only when the source cell is poorer than a threshold, and the target is better than the serving cell by a certain threshold.

Typically, operators use either event A3 or A5 for Handover decision making. By breaking this standard A3 event into two, one event can be used for declaring the UE as a cell edge UE, and the second for handover decision making. The cell edge identification of a UE may be used for other purposes, such as inter-cell interference cancellation (ICIC).

Using greater delta for handover threshold we will only handover when the target cell is better by a larger offset. Instead of using a greater delta threshold, the idea here is not to do a quick/faster handoff, but to delay it so that the call is retained in our cell for longer period.

Cell edge performance (both at serving and target) will be more or less same.

New measurement IDs (RRC signaling) may be added for A1, A2, A3' and A3" events.

In some embodiments, the A3' event may have entering and exit conditions as caused by evaluating the following inequalities, where unless otherwise defined the abbreviations are as defined with respect to § 5.5.4.4 of 3GPP TS 36.331 v9.3.0, hereby incorporated by reference in its entirety for all purposes:

Entry: $Mn+Ofn+Ocn-Hys>Ms+Ofs+Ocs+Off1$

Exit: $Mn+Ofn+Ocn-Hys<Ms+Ofs+Ocs+Off1$ where Off1 is a first offset specific to A3', Off2 is a second offset specific to A3", and Off1<Off2, and wherein the hysteresis is specific to A3'.

In some embodiments, the A3" event may be considered a leaving condition or exit condition for a single A3 event type. The entering and exit conditions may be evaluating the following inequalities:

Entry: $Mn+Ofn+Ocn-Hys>Ms+Ofs+Ocs+Off2$

Exit: $Mn+Ofn+Ocn-Hys<Ms+Ofs+Ocs+Off2$ where Off1 is a first offset specific to A3', Off2 is a second offset specific to A3", and Off1<Off2, and wherein the hysteresis is specific to A3".

A3" may be a transient state in which handover is immediately attempted following successful evaluation of the entry condition.

In some embodiments, the A3" event may be considered a leaving condition or exit condition for a single A3'" event type. The entering and exit conditions for the A''' event may be evaluating the following inequalities:

Entry: $Mn+Ofn+Ocn-Hys>Ms+Ofs+Ocs+Off1$

Exit: $Mn+Ofn+Ocn-Hys<Ms+Ofs+Ocs+Off2$ and immediately initiate handover where Off1 is a first offset, Off2 is a second offset, and Off1<Off2.

Figure 2:
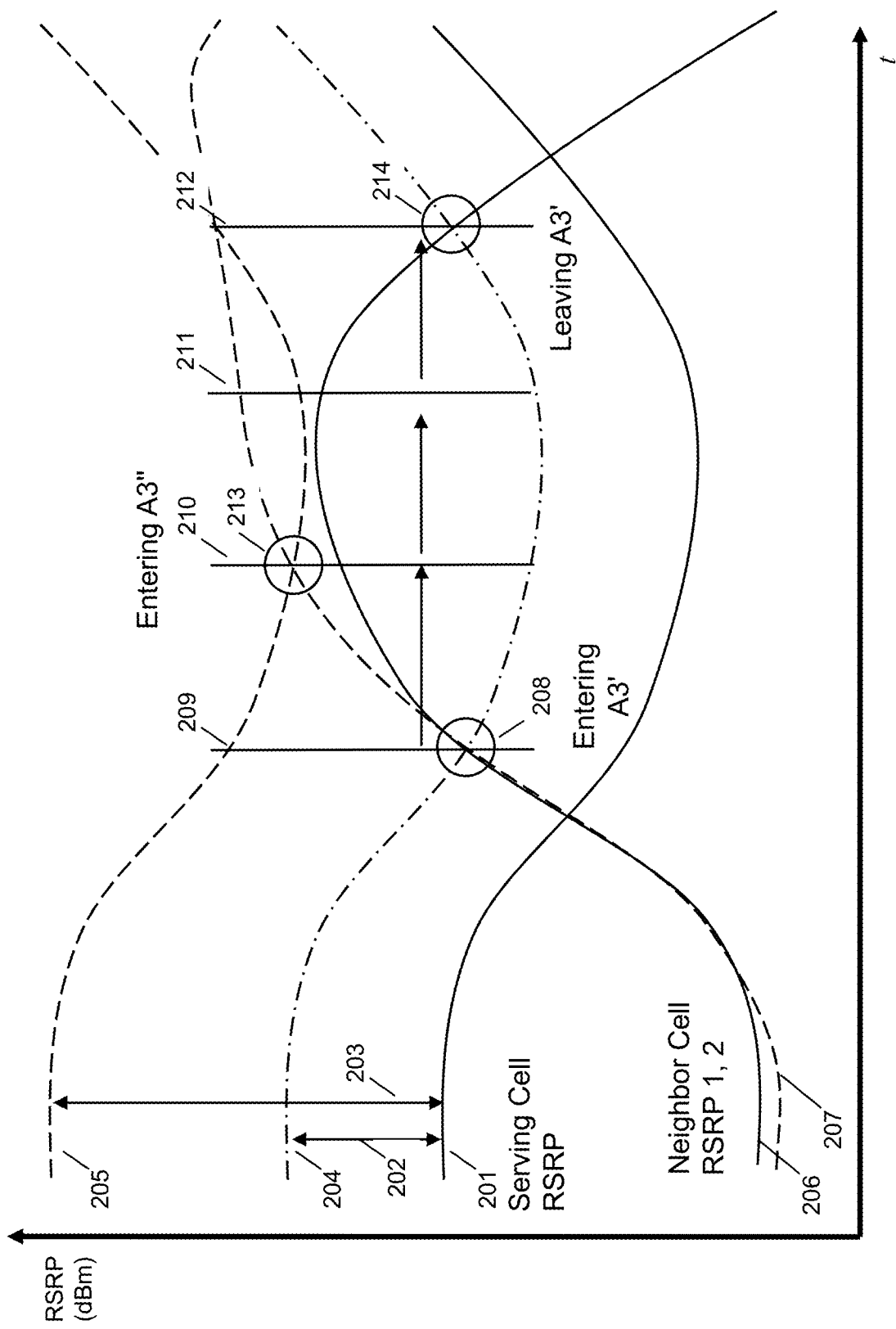
FIG. 2 is a schematic diagram of signal strength of a serving cell and a neighbor cell, in accordance with certain embodiments.

FIG. 2 is a schematic diagram of signal strength of a serving cell and a neighbor cell, in accordance with certain embodiments. A serving eNodeB is providing mobile access to a UE, and the eNodeB has configured the UE to send measurement reports to the eNodeB according to Event A3' and A3" as discussed herein. A chart is shown of reference signal received power (RSRP) against time, showing signal strength of a serving cell 201 against signal strength of two neighbor cells 206, 207, representing two alternate scenarios. A first offset 202 and a second offset 203 are shown, with the second offset being greater than the first offset; line 204 represents serving cell 201's signal plus the first offset; line 205 represents serving cell 201's signal plus the second offset. Line 206 represents a first scenario for a neighbor cell (Neighbor Cell 1). Line 207 represents a second scenario for a neighbor cell (Neighbor Cell 2).

At time 209, a UE identifies that the neighbor cell has a higher RSRP than the serving cell plus the first offset, as shown by crossing lines 208, and trips event A3' as described herein. The serving eNB then directs the UE to send measurement reports periodically, e.g., 210, 211, 212 as shown. The two neighbor cell lines are shown diverging after time 209 to show two different scenarios.

In the first scenario, Neighbor Cell 1 206, represented by the solid line, has an RSRP that increases above line 204 but not above line 205. As a result, at no point does Neighbor Cell 1 cause event A3" to be tripped, and the UE is never handed over to the neighbor cell; instead, the UE exits the A3' state at time 212, shown by crossed lines 214. In the second scenario, Neighbor Cell 2 206 exceeds line 205 at time 210, as shown by crossed lines 213, and causes a handover to the neighbor cell.

Figure 3:
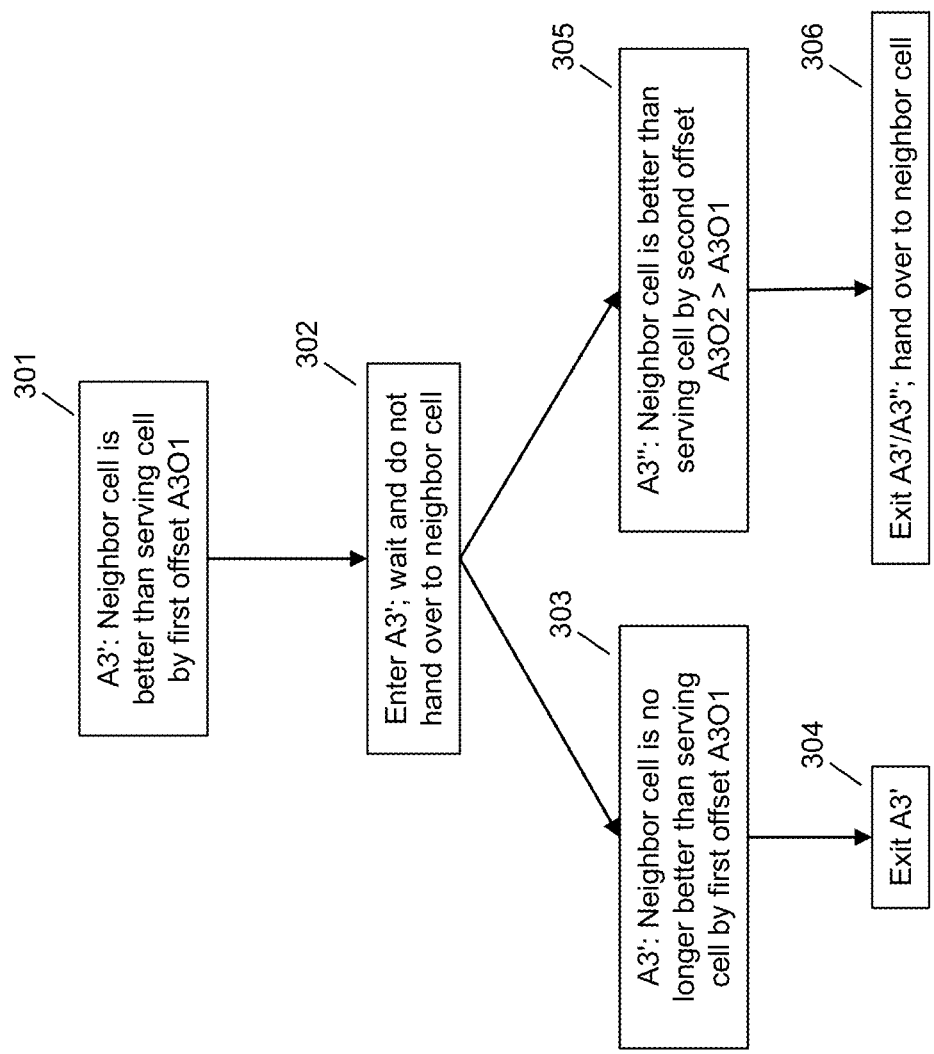
FIG. 3 is a flowchart of an exemplary method.

FIG. 3 is a flowchart of an exemplary method. A serving eNodeB is providing mobile access to a UE, and the eNodeB has configured the UE to send measurement reports to the eNodeB according to Event A3' and A3" as discussed herein. At step 301, a neighboring cell is detected to have better signal strength than the serving cell plus an offset, causing the UE to send a measurement report to the serving cell. The offset shall be identified as A3O1. At step 302, the serving cell instructs the UE to remain attached to itself, but also instructs the UE to enter into a monitoring mode wherein the signal strength of the serving cell and the neighboring cell (and other neighbors if applicable) is periodically sent to the serving cell via measurement reports. While at step 302, the UE may detect one of three situations: possibly no change, which will result in remaining in state A3'; or an improvement of relative signal strength for the serving cell, which will result in step 303; or an improvement in relative signal strength for the neighbor cell, which will result in step 305.

At step 303, the UE detects that the neighbor cell is no longer better than the serving cell by the offset A3O1. This could be due to motion of the UE, motion of the serving cell or neighbor cell, weather, traffic, load, or other circumstances. At this point a handover is not necessary and at step 304, the UE is directed by the eNodeB to exit state A3' and to stop sending measurement reports. A handover from the serving cell to the neighbor cell and a reverse handover ("ping pong" handover) back to the serving cell has been potentially avoided.

At step 305, the UE has detected that the neighbor cell is still better relative to the serving cell, and in fact is significantly better than the serving cell according to a second offset A3O2, which is defined and configured by the eNodeB and is greater than A3O1. At this point the network is configured to cause the UE to hand over to the neighbor cell, as shown at step 306.

Figure 4:
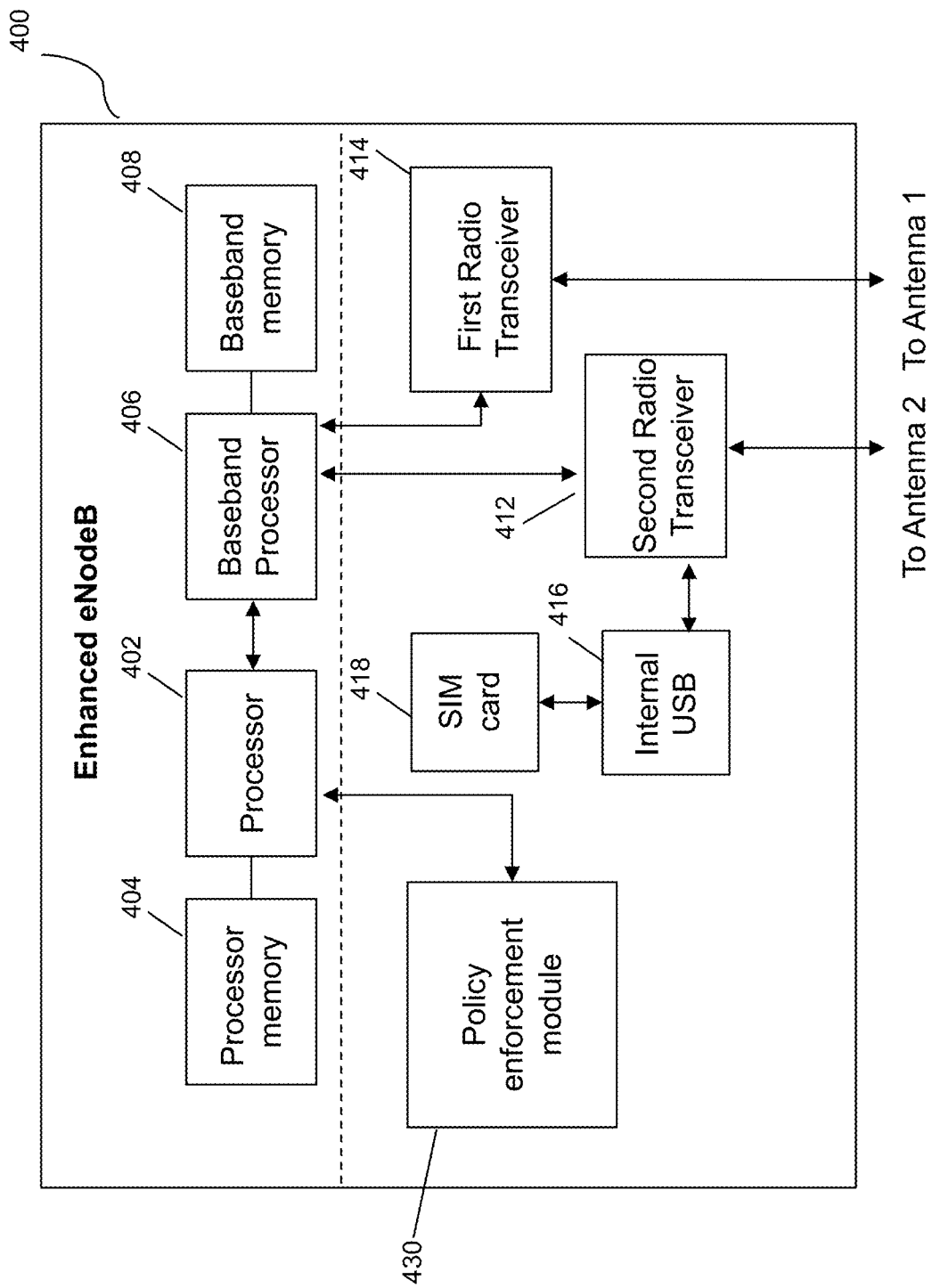
FIG. 4 is a schematic diagram of an enhanced base station, in accordance with certain embodiments.

FIG. 4 is a schematic diagram of an enhanced base station, in accordance with some embodiments. Enhanced base station 400 may be an eNodeB for use with LTE, and may include processor 402, processor memory 404 in communication with the processor, baseband processor 406, and baseband processor memory 408 in communication with the baseband processor. Enhanced eNodeB 400 may also include first radio transceiver 414, which is a Wi-Fi transceiver, and second radio transceiver 412, which is an LTE transceiver; enhanced eNodeB 400 is thus a multi-radio access technology (multi-RAT) node. Enhanced eNodeB 400 may also include internal universal serial bus (USB) port 416, and subscriber information module card (SIM card) 418 coupled to USB port 416. In some embodiments, the second radio transceiver 412 itself may be coupled to USB port 416, and communications from the baseband processor may be passed through USB port 416. Transceiver 414 is connected to Antenna 1, which provides Wi-Fi antenna functionality, and transceiver 412 is connected to Antenna 2, which provides LTE transmit and receive antenna functionality. Wi-Fi radio transceiver 414 may provide, e.g., IEEE 802.11a/b/g/n/ac functionality or other Wi-Fi functionality. In some embodiments, Wi-Fi transceiver and Antenna 1 may provide multiple-in, multiple-out (MIMO) functionality. LTE transceiver 412 may be a user equipment (UE) modem. In other embodiments, a UE modem may be connected via a USB bus.

Processor 402 and baseband processor 406 are in communication with one another. Processor 402 may perform routing functions, and may determine if/when a switch in network configuration is needed. Baseband processor 406 may generate and receive radio signals for both radio transceivers 412 and 414, based on instructions from processor 402. In some embodiments, processors 402 and 406 may be on the same physical logic board. In other embodiments, they may be on separate logic boards.

Either transceiver may be coupled to processor 402 via a Peripheral Component Interconnect-Express (PCI-E) bus, and/or via a daughtercard. As transceiver 412 is for providing LTE UE functionality, in effect emulating a user equipment, it may be connected via the same or different PCI-E bus, or by a USB bus, and may also be coupled to SIM card 418.

SIM card 418 may provide information required for authenticating the simulated UE to the evolved packet core (EPC). When no access to an operator EPC is available, local EPC 420 may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 400 is not an ordinary UE but instead is a special UE for providing backhaul to device 400.

In some embodiments, wireless radio coverage (i.e., access) to user devices may be provided via Wi-Fi radio transceiver 414. In some embodiments, an additional radio transceiver capable of providing LTE eNodeB functionality (not shown) may be provided, and may be capable of higher power and multi-channel OFDMA for providing access. Processor 402 may be configured to provide eNodeB, nodeB, BTS, base station, access point, and/or other functionality.

Wireless backhaul or wired backhaul may be used. Wired backhaul may be an Ethernet-based backhaul (including Gigabit Ethernet), or a fiber-optic backhaul connection, or a cable-based backhaul connection, in some embodiments. Wireless backhaul may be provided using an LTE connection, using LTE UE modem 412. Additionally, wireless backhaul may be provided in addition to wireless transceivers 410 and 412, which may be Wi-Fi 802.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 402 for reconfiguration.

A policy enforcement module 430 may be provided in communication with processor 402. This policy enforcement module 430 may provide PCEF functions, in conjunction with a coordinating node, as further described herein, in some embodiments. Module 430 may communicate with the coordinating node via the backhaul connection. Module 430 may receive rules from the coordinating node. Module 430 may include SPI or DPI inspection modules that run on the processor; a packet processor may also be provided.

Other elements and/or modules may also be included, such as a home eNodeB, a local gateway (LGW), a self-organizing network (SON) module, or another module. Additional radio amplifiers, radio transceivers and/or wired network connections may also be included. The SON module may be configured to provide transmit power increase/decrease functionality, radio band switching functionality, or communications with another remote SON module providing, for example, these types of functionality, in some embodiments. The SON module may execute on the general purpose processor 402.

Processor 402 may identify the appropriate network configuration, and may perform routing of packets from one network interface to another accordingly. Processor 402 may use memory 404, in particular to store a routing table to be used for routing packets. Baseband processor 406 may perform operations to generate the radio frequency signals for transmission or retransmission by both transceivers 410 and 412. Baseband processor 406 may also perform operations to decode signals received by transceivers 410 and 412. Baseband processor 406 may use memory 408 to perform these tasks.

Figure 5:
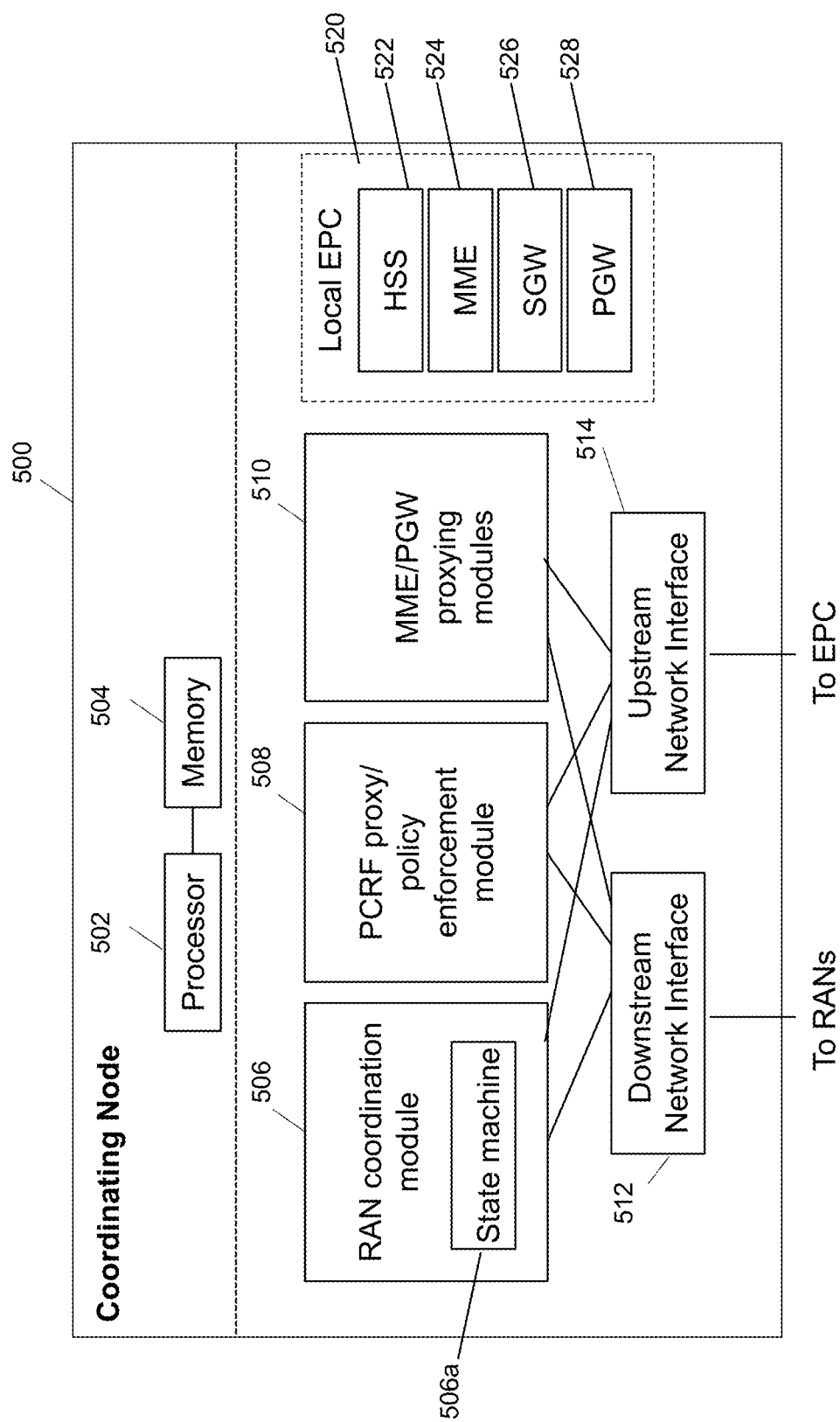
FIG. 5 is a schematic diagram of a coordinating gateway, in accordance with certain embodiments.

FIG. 5 is a schematic diagram of a coordinating node, in accordance with some embodiments. Coordinating node 500 includes processor 502 and memory 504, which are configured to provide the functions described herein. Also present are radio access network coordination/signaling (RAN Coordination and signaling) module 506, PCRF proxy/policy enforcement module 508, and MME/PGW proxying module 510. In some embodiments, coordinator server 500 may coordinate multiple RANs using coordination module 506. In some embodiments, coordination server may also provide proxying, routing virtualization and RAN virtualization. In some embodiments, a downstream network interface 512 is provided for interfacing with the RANs, which may be a radio interface (e.g., LTE), and an upstream network interface 514 is provided for interfacing with the core network, which may be either a radio interface (e.g., LTE) or a wired interface (e.g., Ethernet). Policy enforcement functions described herein may be provided at module 508. Policy enforcement module 508 may also communicate over a Gx interface with a PCRF in the core network via upstream network interface 514.

Coordinating node 500 includes local evolved packet core (EPC) module 520, for authenticating users, storing and caching priority profile information, and performing other EPC-dependent functions when no backhaul link is available. Local EPC 520 may include local HSS 522, local MME 524, local SGW 526, and local PGW 528, as well as other modules. Local PGW 528 may provide functions as described elsewhere herein. Local EPC 520 may incorporate these modules as software modules, processes, or containers. Local EPC 520 may alternatively incorporate these modules as a small number of monolithic software processes. Modules 506, 508, 510 and local EPC 520 may each run on processor 502 or on another processor, or may be located within another device.

Coordinating node 500 may be a pass-through gateway for data tunnels, forwarding data through to a core network. Coordinating node 500 may also provide encryption functions, e.g., using IPsec for encrypting or decrypting data for forwarding over one or more bearers to the core network, and may have access to unencrypted data thereby. In the case that Wi-Fi is used at one or more base stations to provide access to user devices, the coordinating node may be a trusted wireless access gateway (TWAG) or evolved packet data gateway (ePDG), providing the ability for the Wi-Fi user devices to participate in and join the operator network. In some cases, the coordinating node may also provide LIPA or SIPTO IP offload gateway capability. In some cases, coordinating node 500 may be a home eNodeB gateway (HENBGW). Because the built-in QCI and TOS mechanisms used by the methods described herein are passed through by IPsec, GTP-U, and other tunneling protocols, these quality of service (QOS) parameters are preserved by the coordinating node 500.

FURTHER EMBODIMENTS

While a coordinating node is shown in this embodiment, the described method may be used without a coordinating node, e.g., in a standard LTE core network where eNodeBs are connected directly to an operator core network. Alternatively, in some embodiments, the functions and steps described herein may be split among the eNodeB/multi-RAT node and coordinating node, or to a gateway node in a mesh or mixed-backhaul configuration that is providing backhaul to other nodes.

In some embodiments, the radio transceivers described herein may be for base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces. In some embodiments, the base stations described herein may use programmable frequency filters. In some embodiments, the Wi-Fi frequency bands described herein may be channels determined by the respective IEEE 802.11 protocols, which are incorporated herein to the maximum extent permitted by law. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported. The embodiments disclosed herein can be used with a variety of protocols so long as there are contiguous frequency bands/channels. Although the method described assumes a single-in, single-output (SISO) system, the techniques described can also be extended to multiple-in, multiple-out (MIMO) systems.

Those skilled in the art will recognize that multiple hardware and software configurations may be used depending upon the access protocol, backhaul protocol, duplexing scheme, or operating frequency band by adding or replacing daughtercards to the dynamic multi-RAT node. Presently, there are radio cards that can be used for the varying radio parameters. Accordingly, the multi-RAT nodes of the present invention may be designed to contain as many radio cards as desired given the radio parameters of heterogeneous mesh networks within which the multi-RAT node is likely to operate. Those of skill in the art will recognize that, to the extent an off-the shelf radio card is not available to accomplish transmission/reception in a particular radio parameter, a radio card capable of performing, e.g., in white space frequencies, would not be difficult to design.

Those of skill in the art will also recognize that hardware may embody software, software may be stored in hardware as firmware, and various modules and/or functions may be performed or provided either as hardware or software depending on the specific needs of a particular embodiment. Those of skill in the art will recognize that small cells, macro cells, wireless access points, femto gateways, etc. may all benefit from the methods described herein.

In any of the scenarios described herein, where processing may be performed at the cell, the processing may also be performed in coordination with a cloud coordination server. The eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods may be combined. In the scenarios where multiple embodiments are described, the methods may be combined in sequential order, in various orders as necessary.

Although certain of the above systems and methods for providing interference mitigation are described in reference to the Long Term Evolution (LTE) standard, one of skill in the art would understand that these systems and methods may be adapted for use with other wireless standards or versions thereof.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A base station enabling a handover decision, comprising:
    a processor performing instructions;
    a first radio interface in communication with a user equipment (UE) and coupled to the processor;
    a backhaul connection in communication with an operator core network and coupled to the processor; and
    a memory containing the instructions, which, when executed by the processor, cause the base station to:
    configure a UE with a first offset for a first cell and a second offset for the first cell, the second offset greater than the first offset;
    instruct the UE to enter a handover decision state upon receiving a first measurement report from a UE indicating that a neighbor cell has a better received signal strength than the serving cell by the first offset;
    instruct the UE to send periodic measurement reports with signal strength of the serving cell and the neighbor cell;
    delay a handover decision by remaining in the handover decision state until a second measurement report from the UE is received;
    instruct the UE to hand over to the neighbor cell when the neighbor cell has a better received signal strength than the serving cell by the second offset; and configure the UE to accelerate handover from a macro cell to a small cell by using a small offset enabling traffic offload, and to reduce handover from a small cell to a macro cell by using a large offset thereby providing improvements in handover performance based in part on cell type.

2. The base station of claim 1, wherein the base station configures the UE with a first hysteresis and a second hysteresis.

3. The base station of claim 1, wherein the base station configures the UE with a per-cell first offset and a per-cell second offset.

4. The base station of claim 1, wherein the base station instructs a second UE to exit the handover decision state when the second measurement report indicates that the neighbor cell no longer has a better received signal strength than the serving cell by the first offset.

5. A base station enabling a handover decision, comprising:
   a processor performing instructions;
   a first radio interface in communication with a user equipment (UE) and coupled to the processor;
   a backhaul connection in communication with an operator core network and coupled to the processor; and
   a memory containing the instructions, which, when executed by the processor, cause the base station to:
   configure a UE with a first offset for a first cell and a second offset for the first cell, the second offset greater than the first offset;
   instruct the UE to enter a handover decision state upon receiving a first measurement report from a UE indicating that a neighbor cell has a better received signal strength than the serving cell by the first offset;
   instruct the UE to send periodic measurement reports with signal strength of the serving cell and the neighbor cell;
   delay a handover decision by remaining in the handover decision state until a second measurement report from the UE is received;
   instruct the UE to exit the handover decision state when the second measurement report indicates that the neighbor cell no longer has a better received signal strength than the serving cell by the first offset; and
   configure the UE to accelerate handover from a macro cell to a small cell by using a small offset enabling traffic offload, and to reduce handover from a small cell to a macro cell by using a large offset thereby providing improvements in handover performance based in part on cell type.

6. The base station of claim 5, wherein the base station configures the UE with a first hysteresis and a second hysteresis.

7. The base station of claim 5, wherein the base station configures the UE with a per-cell first offset and a per-cell second offset.

8. The base station of claim 5, wherein the base station instructs a second UE to hand over to the neighbor cell when the neighbor cell has a better received signal strength than the serving cell than the second offset.

* * * * *